(12) United States Patent
Terada et al.

(10) Patent No.: US 7,337,321 B2
(45) Date of Patent: Feb. 26, 2008

(54) DIGITAL CONTENT PROTECTION USING INVISIBLE AND VISIBLE WATERMARKS

(75) Inventors: Koichi Terada, Sagamihara (JP); Yukio Fujii, Yokohama (JP); Yoshifumi Fujikawa, Sagamihara (JP); Taruhi Iwagaki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 732 days.

(21) Appl. No.: 10/230,431

(22) Filed: Aug. 29, 2002

(65) Prior Publication Data

US 2003/0191941 A1 Oct. 9, 2003

(30) Foreign Application Priority Data

Apr. 5, 2002 (JP) ............................. 2002-104378

(51) Int. Cl.
*H04L 9/00* (2006.01)
(52) U.S. Cl. ...................................... 713/176; 713/193
(58) Field of Classification Search ................ 713/193, 713/176
See application file for complete search history.

(56) References Cited

U.S. PATENT DOCUMENTS

| | | | | |
|---|---|---|---|---|
| 5,636,292 A * | 6/1997 | Rhoads | ...................... | 382/232 |
| 5,734,752 A * | 3/1998 | Knox | ........................ | 358/3.28 |
| 5,790,703 A * | 8/1998 | Wang | ........................ | 358/3.28 |
| 5,875,249 A * | 2/1999 | Mintzer et al. | ............... | 380/54 |
| 5,933,798 A * | 8/1999 | Linnartz | .................... | 702/191 |
| 5,995,951 A * | 11/1999 | Ferguson | ..................... | 706/10 |
| 6,031,914 A * | 2/2000 | Tewfik et al. | ................. | 380/54 |
| 6,037,984 A * | 3/2000 | Isnardi et al. | .......... | 375/240.21 |
| 6,064,764 A * | 5/2000 | Bhaskaran et al. | ......... | 382/183 |
| 6,111,990 A * | 8/2000 | Sugaya et al. | .............. | 382/250 |
| 6,131,162 A * | 10/2000 | Yoshiura et al. | ............ | 713/176 |
| 6,182,218 B1 * | 1/2001 | Saito | ........................ | 713/176 |
| 6,216,228 B1 * | 4/2001 | Chapman et al. | ........... | 713/176 |
| 6,233,684 B1 * | 5/2001 | Stefik et al. | ................ | 713/176 |

(Continued)

FOREIGN PATENT DOCUMENTS

JP 2000 165652 6/2000

(Continued)

OTHER PUBLICATIONS

Craver et al., Resolving rightful ownerships with invisible watermarking techniques: limitations, attacks, and implications, May 1998, IEEE Journal on Selected Areas in Communications, vol. 16, Issue 4, pp. 573-586.*

(Continued)

*Primary Examiner*—Nasser Moazzami
*Assistant Examiner*—David Garcia Cervetti
(74) *Attorney, Agent, or Firm*—Mattingly, Stanger, Malur & Brundidge, P. C.

(57) ABSTRACT

A technique for distributing digital contents capable of effectively protecting copyrights and the like on the basis of invisible electronic watermark information and electronic watermark information is to be provided. On the sending side, additional information including copyright-related information is embedded into digital contents in advance as invisible electronic watermark information, while on the receiving side, additional information as the embedded invisible electronic watermark information is decoded and extracted as visible watermark information, the extracted information is embedded again into the digital contents, and the additional information is distributed or outputted as visible information together with the digital contents.

11 Claims, 7 Drawing Sheets

U.S. PATENT DOCUMENTS

| | | | |
|---|---|---|---|
| 6,246,777 B1 * | 6/2001 | Agarwal et al. | 382/100 |
| 6,263,086 B1 * | 7/2001 | Wang | 382/100 |
| 6,289,460 B1 * | 9/2001 | Hajmiragha | 726/28 |
| 6,298,166 B1 * | 10/2001 | Ratnakar et al. | 382/248 |
| 6,304,861 B1 * | 10/2001 | Ferguson | 706/10 |
| 6,310,962 B1 * | 10/2001 | Chung et al. | 382/100 |
| 6,320,829 B1 * | 11/2001 | Matsumoto et al. | 369/47.12 |
| 6,341,350 B1 * | 1/2002 | Miyahara et al. | 713/176 |
| 6,342,924 B1 * | 1/2002 | Ikeda et al. | 348/473 |
| 6,351,777 B1 * | 2/2002 | Simonoff | 709/250 |
| 6,397,191 B1 * | 5/2002 | Notani et al. | 705/9 |
| 6,490,681 B1 * | 12/2002 | Kobayashi et al. | 713/171 |
| 6,504,941 B2 * | 1/2003 | Wong | 382/100 |
| 6,560,637 B1 * | 5/2003 | Dunlap et al. | 709/204 |
| 6,603,576 B1 * | 8/2003 | Nakamura et al. | 358/3.28 |
| 6,625,295 B1 * | 9/2003 | Wolfgang et al. | 382/100 |
| 6,628,417 B1 * | 9/2003 | Naito et al. | 358/1.15 |
| 6,636,551 B1 * | 10/2003 | Ikeda et al. | 375/130 |
| 6,643,663 B1 * | 11/2003 | Dabney et al. | 707/102 |
| 6,668,068 B2 * | 12/2003 | Hashimoto | 382/100 |
| 6,674,874 B1 * | 1/2004 | Yoshida et al. | 382/100 |
| 6,678,389 B1 * | 1/2004 | Sun et al. | 382/100 |
| 6,694,040 B2 * | 2/2004 | Hayashi et al. | 382/100 |
| 6,700,989 B1 * | 3/2004 | Itoh et al. | 382/100 |
| 6,707,465 B2 * | 3/2004 | Yamazaki et al. | 345/629 |
| 6,708,172 B1 * | 3/2004 | Wong et al. | 707/10 |
| 6,721,437 B1 * | 4/2004 | Ezaki et al. | 382/100 |
| 6,728,883 B1 * | 4/2004 | Kohashi et al. | 726/26 |
| 6,731,409 B2 * | 5/2004 | Wang | 358/3.28 |
| 6,731,776 B1 * | 5/2004 | Fujiwara | 382/100 |
| 6,748,533 B1 * | 6/2004 | Wu et al. | 713/176 |
| 6,769,061 B1 * | 7/2004 | Ahern | 713/176 |
| 6,807,285 B1 * | 10/2004 | Iwamura | 382/100 |
| 6,834,344 B1 * | 12/2004 | Aggarwal et al. | 713/176 |
| 6,850,619 B1 * | 2/2005 | Hirai | 380/203 |
| 6,876,460 B2 * | 4/2005 | Torigoe | 358/1.14 |
| 6,901,515 B1 * | 5/2005 | Muratani | 713/176 |
| 6,922,777 B1 * | 7/2005 | Iwamura | 713/165 |
| 6,965,996 B2 * | 11/2005 | Hirano et al. | 713/176 |
| 6,980,668 B1 * | 12/2005 | Naito et al. | 382/100 |
| 7,007,165 B1 * | 2/2006 | Tsuria | 713/176 |
| 7,010,569 B2 * | 3/2006 | Okayasu et al. | 709/204 |
| 7,031,471 B2 * | 4/2006 | Stefik et al. | 380/231 |
| 7,159,117 B2 * | 1/2007 | Tanaka | 713/176 |
| 2001/0008557 A1 * | 7/2001 | Stefik et al. | 380/202 |
| 2001/0010733 A1 * | 8/2001 | Tomomatsu | 382/135 |
| 2001/0012019 A1 * | 8/2001 | Yamazaki et al. | 345/639 |
| 2001/0026616 A1 * | 10/2001 | Tanaka | 380/202 |
| 2001/0042056 A1 * | 11/2001 | Ferguson | 706/10 |
| 2001/0046307 A1 * | 11/2001 | Wong | 382/100 |
| 2001/0056468 A1 * | 12/2001 | Okayasu et al. | 709/204 |
| 2002/0018228 A1 * | 2/2002 | Torigoe | 358/1.14 |
| 2002/0106192 A1 * | 8/2002 | Sako | 386/94 |
| 2002/0146147 A1 * | 10/2002 | Levy | 382/100 |
| 2002/0146148 A1 * | 10/2002 | Levy | 382/100 |
| 2002/0159755 A1 * | 10/2002 | Kuroda | 386/94 |
| 2003/0023682 A1 * | 1/2003 | Brown et al. | 709/204 |
| 2003/0046193 A1 * | 3/2003 | Aschick et al. | 705/28 |
| 2003/0046240 A1 * | 3/2003 | Stone et al. | 705/51 |
| 2003/0061130 A1 * | 3/2003 | Hoffman et al. | 705/30 |
| 2003/0112273 A1 * | 6/2003 | Hadfield et al. | 345/751 |
| 2003/0128860 A1 * | 7/2003 | Braudaway et al. | 382/100 |
| 2003/0191941 A1 * | 10/2003 | Terada et al. | 713/176 |
| 2004/0044648 A1 * | 3/2004 | Anfindsen et al. | 707/1 |
| 2004/0085354 A1 * | 5/2004 | Massand | 345/751 |
| 2004/0205653 A1 * | 10/2004 | Hadfield et al. | 715/530 |
| 2005/0129270 A1 * | 6/2005 | Prakash | 382/100 |
| 2005/0138554 A1 * | 6/2005 | Bell et al. | 715/530 |
| 2007/0130339 A1 * | 6/2007 | Alcorn et al. | 709/225 |

FOREIGN PATENT DOCUMENTS

| | | |
|---|---|---|
| JP | 2000 242605 | 9/2000 |
| JP | 2001-177816 | 6/2001 |

OTHER PUBLICATIONS

Huggett et al., Invisible watermarking for digital video applications and challenges, Apr. 2000, IEEE Seminar on Secure Images and Image Authentication, pp. 9/1-9/6.*

* cited by examiner

PRIOR ART

DIGITAL CONTENT PROTECTION USING INVISIBLE AND VISIBLE WATERMARKS

BACKGROUND OF THE INVENTION

The present invention relates to a technique for visually supplementing digital contents including digital video data and digital audio data with additional information, such as information concerning copyright protection, so as to distribute or output such contents for the purpose of protecting copyrights to images and preventing their unauthorized alteration.

DESCRIPTION OF THE PRIOR ART

Generally in digital image technology handling images as digital data, as compared with analog image technology, it is easier to copy images using a computer or the like without deteriorating the image quality and electronically transmit them through a network. For this reason, digital images involve a greater risk of being easily copied and redistributed illegally. Techniques according to the prior art for avoiding such a risk include what is known as electronic watermarking. There are two types of electronic watermarks: an invisible type in which watermarked information including copyright information and user information is invisibly embedded and a visible type in which the logo or the like of the copyright holding company is visibly formed in the image.

If an invisible type electronic watermark is used, the hidden presence of the watermarked information cannot be recognized merely by looking at the watermarked image. This features make the invisible type more difficult than the visible type to be deleted but less effective in preventing illegal copying and illegal distribution. However, it has the advantage of permitting, if a digital image is illegally copied or distributed, the illegal user can be identified by the user ID or the like embedded as watermarked information because the watermarked information remains in the digital image. An invisible type electronic watermark is disclosed in, for instance, U.S. Pat. No. 5,636,292.

On the other hand, a visible type electronic watermark, which is visibly written on a digital image, makes the image uncomfortable to use as it is, and therefore has the effect of deterring a potentially infringing user from illegally copying or distributing the digital image. According to the prior art, in many cases a visible type electronic watermark is used in such a way that image representing copyright information, such as the logo or the like of the copyright owner, is superimposed into the original image by superimposing the copyright information over part of the original image. However, this superimposing often impairs that part of the original image. Moreover, by a relatively easy method such as overwriting only the watermark part with some other image, the copyrighted image may be illegally copied or distributed with the illegality of the use thereby concealed.

Techniques to compensate for this shortcoming include one disclosed in the Japanese Patent Laid-open No. 2001-177816. This patent application describes a technique by which the pertinent copyright is protected by holding digital images and information on the attributes of the digital images and embedding the attribute information into any given digital image using both an invisible watermark and a visible watermark. This technique is supposed to enable a legitimate user to restore the full original image by superimposing copyright information and the like in a visible form with the visible watermark and embedding the part of image information lost by the superposition of the visible watermark into the invisible watermark.

FIG. 2 illustrates an example of the prior art. This example is an image server capable of holding digital images and attribute information on digital images, and embedding into any desired digital image corresponding attribute information.

In FIG. 2, reference numeral 7 denotes an image server apparatus, configured of a control port 101, a stream output port 102, a stream input port 103, a meta information input port 104, a visible watermark superimposing means 112, an image server managing means 113, an image memory means 115 and a meta information memory means 117. In such a configuration, when an image is to be stored into the image server apparatus 7, a data acceptance instruction is given to the image server managing means 113 via the control port 101. Then, under the control of the image server managing means 113, video data are stored into the image memory means 115 via the stream port 103, and additional information regarding the image is stored into the meta information memory means 117 via the meta information input port 104. The meta information may include, for instance, information used for copyright protection, such as right owner information, information on restricted distribution and logo image information in addition to basic attribute information such as the name and size of the image. When an image stored in the image server apparatus 7 is to be taken out, a data extracting instruction is given to the image server managing means 113 via the control port 101. On the basis of this instruction, the image server managing means 113 causes the image memory means 115 to supply the pertinent video data. Further, the image server managing means 113 selects meta information data corresponding the aforementioned video data out of the group of meta information stored in the meta information memory means 117, and causes them to be outputted. Then, the visible watermark superimposing means 112 superimposes the meta information data either in part or in whole over the aforementioned video data, and outputs them through the output port 102. The actions so far described cause the image server apparatus 7 to process storing and reading of video data and meta information data incidental thereto, inputted from outside.

In the above-described example of the prior art, if the copyright information is embedded into the digital image merely with an invisible electronic watermark, the psychological deterrent effect against unauthorized copying and other illegal acts is insufficient as explained above. Or if a visible electronic watermark merely for stating copyright information is embedded into the digital image, there is a greater risk of allowing unauthorized copying or distribution easily, and no deterrent effect can be expected either. Furthermore, according to the technique described in the Japanese patent laid-open cited above, additional information regarding the copyright and other matters to be watermarked in the image needs independent management from the original image, necessitating complicated management of consistency between the original image and the corresponding copyright information. The complicatedness would be especially great where frequent updating of the image is anticipated, such as in the quotation of live news images by a broadcaster. Moreover, in the above-cited example of the prior art, an internal database for managing meta information (additional information) is needed independent of the video data, and accordingly implementation as a single storage system is impossible. Therefore, in the case of this example of the prior art, the function is implemented not as a storage system but as an image server apparatus. This example also requires independent management and storage of video data and additional information corresponding the video data, such as right owner information. For this reason, when storing the video data, for instance, there will be required a sequence of processing including, first opening a file for storing the video data in the write mode, followed by writing of the video data, closing of the file after writing the whole video data and, separately from this sequence, another sequence of opening a file for storing additional information, writing the additional information and then closing this file. In this case, since video data and additional information corresponding the video data are stored in different files, some means to associate them is needed when reading them out. However, as the file system of any usual operating system has no such function to individually record associations between a plurality of files, a superior interface can be realized not as a file system interface but only as a still superior server program interface. Thus, there will be needed an arrangement providing that, for instance, if in the same directory of the file storing video data there is a file whose name has a specific additional characters at the end, that file will contain right owner information on that image file, and such an arrangement would be beyond the manageable scope of the file system. Therefore, this example of the prior art requires a server program for understanding and executing such an arrangement. Furthermore, in storing video data, for instance, in this example of the prior art, a file for storing the video data is opened in the write mode, the video data are then written in, and the file is closed after writing the whole video data. Further, separately from this sequence, right owner information is stored into a special area associated with the file descriptor of the video data. In this way, when reading out video data, the associated right owner information can be taken out by opening the video data in a single file. In order to realize this arrangement, the aforementioned special area is needed in the file system, and therefore any existing file system of a usual operating system cannot be used, but a special file system will have to be developed for each operating system.

Problems to be solved by the present invention include, in view of the limitations of the prior art described above, enabling a distribution technique or a data storage technique for digital contents, such as digital images, (1) to output digital image information into which a visible electronic watermark is embedded, (2) to eliminate the need to manage copyright-related information and additional information embedded as a watermark separately from the original image, (3) to obtain by simple manipulation digital image information into which a visible electronic watermark is embedded, and (4) to make the information difficult to alter and thereby to effectively prevent illegal use by, for instance, making the picture being readily deteriorated by any altering attempt that may be made.

SUMMARY OF THE INVENTION

An object of the present invention is to provide a technique that can solve these problems.

In order to solve the problems, the invention provides a distribution technique or a data storage technique for data, such as digital contents, having a basic configuration in which additional information including copyright-related information is embedded in advance as an invisible electronic watermark into the digital contents on the sending side (a data transmitting apparatus), and on the receiving side (a contents distribution apparatus and a data storage apparatus) the embedded invisible electronic watermark information is decoded and extracted as visible watermark information, the extracted visible watermark information is embedded again into the digital contents, and the additional information is distributed or outputted as visible information together with the digital contents. More specifically, (1) a data transmitting apparatus as the sending side apparatus is configured of a means for inputting digital contents, a means for encoding additional information as invisible electronic watermark information and embedding the encoded information into the digital contents, and a means for outputting the digital contents into which the invisible electronic watermark information is embedded. A contents distributing apparatus for visibly arranging additional information on digital contents and distributing the contents is configured of (2) a receiver means for receiving a first information signal consisting of the digital contents in which additional information is embedded as invisible electronic watermark information, a decoding means for decoding the additional information as invisible electronic watermark information embedded into the received information and extracting it as visible watermark information, and a visible watermark information superimposing means for superimposing the extracted visible watermark information into the digital contents to form a second information signal, and distributes the additional information as visible information together with the digital contents. (3) A contents distributing apparatus for visibly arranging additional information on digital contents and distributing the contents is configured of a receiver means for receiving a first information signal consisting of the digital contents in which additional information is embedded as invisible electronic watermark information, a decoding means for decoding the additional information as invisible electronic watermark information embedded into the received first information signal and extracting it as visible watermark information, a visible watermark information superimposing means for superimposing the extracted visible watermark information into the digital contents to form a second information signal, and a selector means for selecting and outputting the first information signal or second information signal, and distributes the additional information as visible information together with the digital contents. (4) A contents distributing apparatus for visibly arranging additional information on digital contents and distributing the contents is configured of a receiver means for receiving a first information signal consisting of the digital contents in which additional information is embedded as invisible electronic watermark information, a memory means for storing digital contents in the received information signal, a decoding means for decoding the additional information as invisible electronic watermark information embedded into the received information signal and extracting it as visible watermark information, a visible watermark information superimposing means for superimposing the extracted visible watermark information into the digital contents read out of the memory means to form a second information signal, and a means for outputting the second information signal, and distributes the additional information as visible information together with the digital contents. (5) The contents distribution apparatus, as stated in (2), (3) or (4) above, so configured that the additional information be either right owner information or information on viewing/listening restriction. (6) A contents distribution system for distributing digital contents is configured of a transmitting means for encoding additional information as invisible electronic watermark information, embedding the encoded information into the digital contents, and transmitting the digital contents with the additional information to a network as a first information signal, and a distributing means for receiving the first information signal from the network, decoding the additional information as the embedded invisible electronic watermark information, extracting it as visible watermark information, superimposing it again into the digital contents to form a second information signal, and transmitting the signal, and distributes the digital contents with the additional information visibly arranged thereon. (7) A data storage apparatus capable of visibly arranging additional information on digital contents and outputting the digital contents of this arrangement is provided with an input means for receiving a first information signal consisting of digital contents in which additional information is embedded as invisible electronic watermark information, a memory means for storing the digital contents in the received information signal, a decoding means for decoding the additional information as invisible electronic watermark information embedded in the received information signal and extracting it as visible watermark information, a visible watermark information superimposing means for superimposing the extracted visible watermark information into the digital contents read out of the memory means to form a second information signal, and an output means for outputting the second information signal, wherein the input means and the output means are configured as an interface of a file system, and are capable of outputting the additional information as visible information together with the digital contents. (8) By a digital contents distribution method of visibly arranging additional information on digital contents and distributing the digital contents of this arrangement, the additional information is distributed as visible information together with the digital contents through a step of receiving a first information signal consisting of the digital contents in which the additional information is embedded as invisible electronic watermark information, a step of decoding the additional information as invisible electronic watermark information embedded in the received information signal and extracting it as visible watermark information, and a step of superimposing the extracted visible watermark information into the digital contents to form a second information signal. (9) By a digital contents distribution method, the additional information is distributed as visible information together with the digital contents through a step of receiving a first information signal consisting of the digital contents in which the additional information is embedded as invisible electronic watermark information, a step of decoding the additional information as invisible electronic watermark information embedded in the received first information signal and extracting it as visible watermark information, a step of superimposing the extracted visible watermark information into the digital contents to form a second information signal, and a step of selecting and outputting the first information signal or second information signal. (10) By a digital contents distribution method, the additional information is distributed as visible information together with the digital contents through a step of receiving a first information signal consisting of the digital contents in which the additional information is embedded as invisible electronic watermark information, a step of storing the digital contents in the received information signal, a step of decoding the additional information as invisible electronic watermark information embedded in the received information signal and extracting it as visible watermark information, a step of superimposing the extracted visible watermark information into the digital contents readout of the memory means to form a second information signal, and a step of outputting the second information signal.

DETAILED DESCRIPTION OF THE PREFERRED EMBODIMENTS

Preferred embodiments of the present invention will be described below with reference to accompanying drawings.

Figure 1:
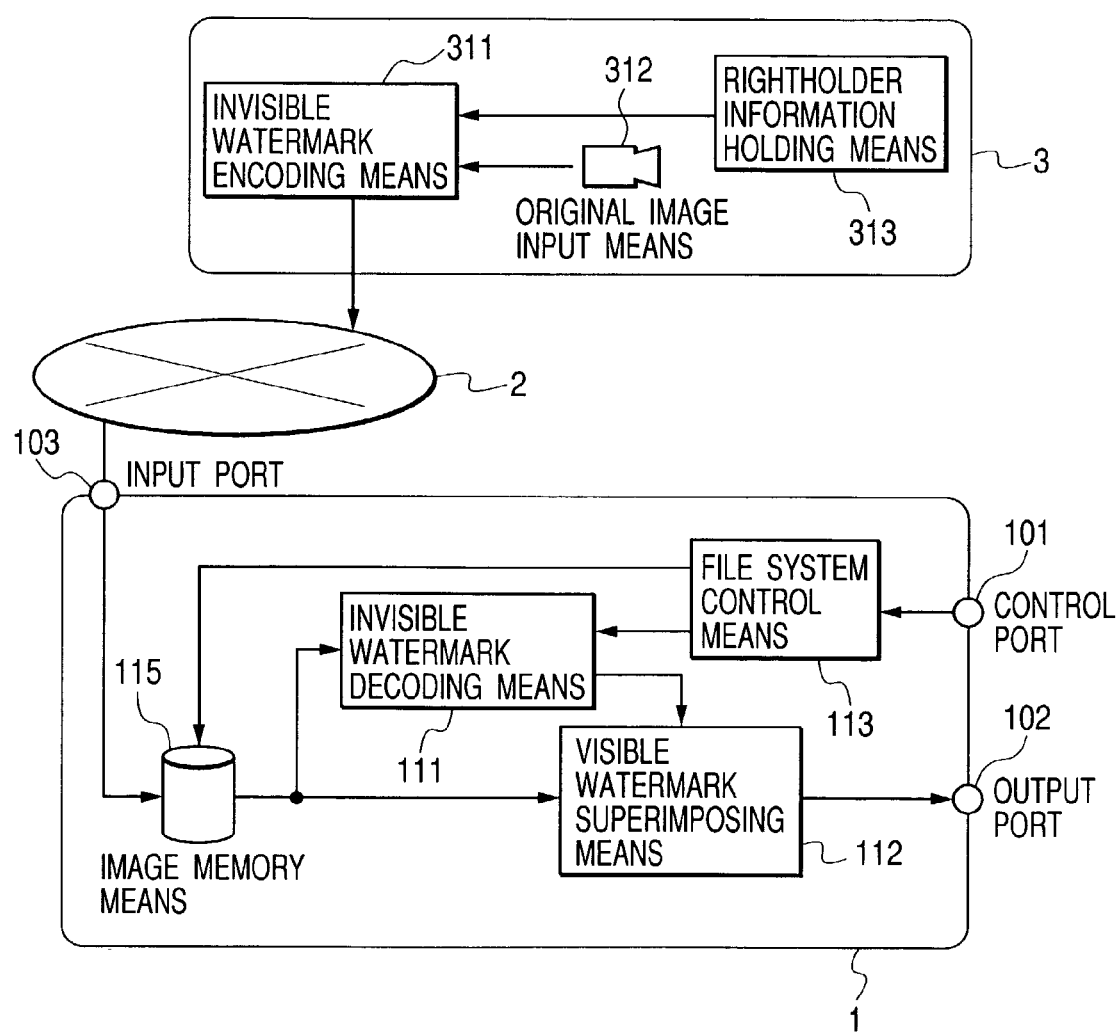
FIG. 1 illustrates a first preferred embodiment of the present invention.
Figure 2:
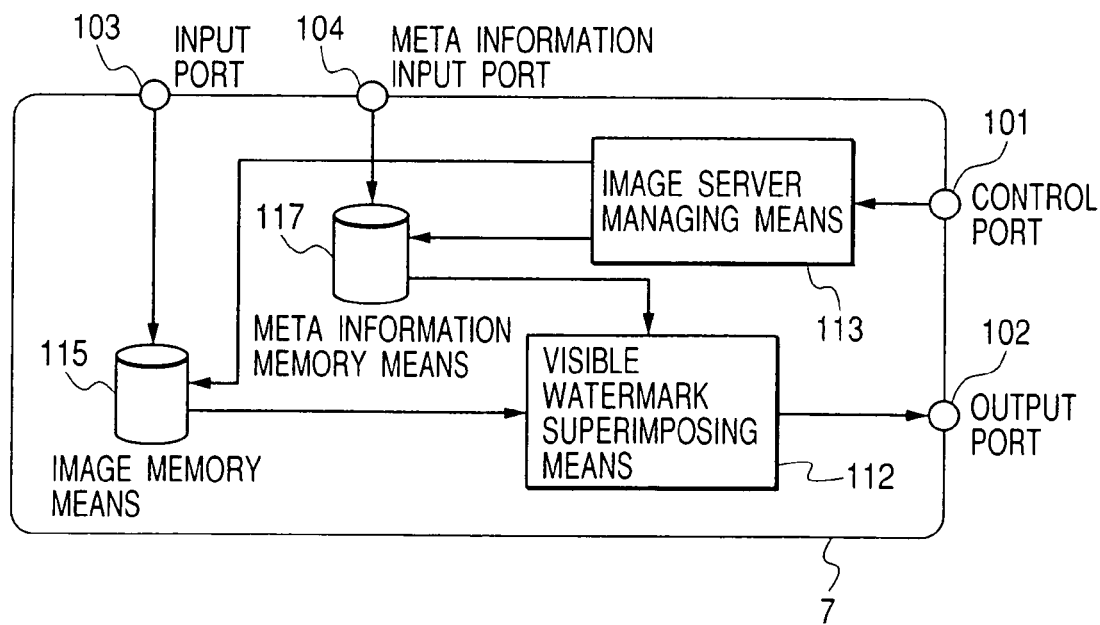
FIG. 2 illustrates an example of the prior art.

FIG. 1 illustrates a first preferred embodiment of the invention.

This example is a case in which copyright owner information is distributed as additional information together with digital contents.

In FIG. 1, reference numeral 1 denotes a video storage as a contents distribution apparatus for receiving and distributing video data as digital contents; 2, a network; 3, a contents holder having a data transmitting apparatus for transmitting the digital contents to the video storage 1 via the network 2; 101, a control port; 102, an output port; 103, an input port; 111, an invisible watermark decoding means, 112, a visible watermark superimposing means; 113, a file system control means; and 115, an image memory means. The contents holder 3 is provided with an invisible watermark encoding means 311 for encoding an invisible watermark and embedding it into original video data, an original image input means 312 for inputting original video data, and a right holder information holding means 313 for memorizing (storing) right owner information as additional information.

This first embodiment operates as described below.

In the contents holder 3, right owner information from the right holder information holding means 313 and original video data from the original image input means 312 are inputted into the invisible watermark encoding means 311, in which the right owner information is encoded as an invisible watermark, embedded into the video data, and the video data in which the invisible watermark is embedded are outputted to the network 2. The original video data may be either directly inputted from the input means, or once stored into an internal memory means and inputted from there. The right owner information may also be either stored in advance or, for instance, inputted in parallel with the original video data. The video data in which the invisible watermark is embedded may be outputted as they are on a real time basis, or temporarily stored in the memory means and outputted as appropriate. The video data outputted from the contents holder 3 are transmitted to the video storage 1 via the network 2. The network 2 may be, for instance, a local area network (LAN) connection by network cable, data connection via ordinary public telephone line, digital satellite broadcasting, path connection between components in the apparatus, or even virtual connection having no physical substance on a single computer. Further, between the contents holder 3 and the video storage 1, data may be transferred on a real time basis or, instead of the network 2, a means for temporary storage of video data, for instance a large capacity data storage means such as a digital versatile disk or digital video disc (DVD), may be provided, in which the video data outputted from the contents holder 3 and later read into the video storage 1. If the video data are to be temporarily stored in the contents holder 3, the video storage 1 receives the video data from the network 2 via the input port 103, and stores the video data, into which the invisible watermark is embedded, into the image memory means 115. In this process, as required, the file system control means can appropriately update file system management information.

The above-described data storing operation will be explained below by analogy with the operation of writing into the file system of a usual operating system. In the case of a program on a usual operating system, for instance, a path name and an access mode are given as the parameters to open a file, and a file descriptor is thereby obtained. Then, with the file descriptor as the parameter, data are read, written or sought as required, and the file is closed at the end. In this first embodiment of the invention, a program intending to store video data into the video storage 1 requests the video storage 1 to open a file. As the parameter for use then, a descriptor for identifying the needed video data, i.e. the path name in the file system is given. The file system control means 113 allocates a storage area for the video data in the image memory means 115, and performs preparatory processing for accessing the area. It also allocates information for locating the position of the data storage area to the given path name. Upon completion of the preparatory processing, the file system control means 113 generates a file descriptor corresponding each set of file open processing, and hands it over to the program requesting the opening of the file. This completes the processing of file opening. Next, the program requests writing of the video data, and sequentially delivers the substantial parts of the video data. The file system control means 113 receives these requests and data, stores the data into the image memory means 115 and, as required, processes allocation of an additional data storage area. When the program has finished delivering all the video data, a file close request is made. Upon receiving the file close request, the file system control means 113 releases the file descriptor assigned at the time of opening the file. The operation to store data into the file system is accomplished as described so far.

The operation that takes place when the video storage 1 has received an image read request from outside will be described below.

The video storage 1 receives the read request from outside via the control port 101. The read request received by the video storage 1 is interpreted by the file system control means 113, which takes out the requested video data from the image memory means 115. The video data that have been taken out are sent to the invisible watermark decoding means 111, which extracts right owner information as additional information, embedded in advance in the video data, and sends it to the visible watermark superimposing means 112. The visible watermark superimposing means 112, on the basis of the extracted right owner information, superimposes a visible watermark over the video data, and outputs to the output port 102 the video data over which the visible watermark has been superimposed. This read operation will be described below by analogy with the operation to read out of a file system in a usual operating system as was the write operation above.

A program intending to read out of the video storage 1 video data stored therein requests the video storage 1 to open a file. As the parameter for use then, a descriptor for identifying the needed video data, i.e. the path name in the file system is given. The file system control means 113, on the basis of the path name that has been given, locates the area in the image memory means 115 in which the specified video data are stored, and performs preparatory processing for accessing the area. Upon completion of the preparatory processing, the file system control means 113 generates a file descriptor corresponding each set of file open processing, and hands it over to the program requesting the opening of the file. This completes the processing of file opening.

Next, the program makes a request to seek for the position in the specified video data from which data are to be read out, followed by a request to read the video data. As these requests are made, the file system control means 113 seeks for the storage position of the specified data, and reads the desired data out of the image memory means 115. The video data that have been read out are sent to the invisible watermark decoding means 111, which extracts the right owner information embedded in the video data. The right owner information is superimposed over the video data already read out by the visible watermark superimposing means 112, outputted as read data from the file system, and handed over to the program. Since the above-described processing in this read operation takes place within the file system, the program using the video data is not aware of the presence of the invisible watermark decoding or the visible watermark embedding for the video data. Upon completion of the reading of required video data, the program makes a file close request. Upon receipt of the file close request, the file system control means 113 releases the file descriptor assigned at the time of opening the file, and the operation to read the video data is completed. The processing to read, in a state in which the visible watermark is superposed, the video data stored in the image memory means 115 in the video storage 1 is accomplished in the procedure described so far. The video storage 1 is configured as, for instance, a file system in a storage system.

This first embodiment of the invention, because it combines an invisible watermark with a visible watermark, can effectively protect the rights of the copyright owner. Since an interface as a storage apparatus can be provided to an apparatus having a watermark processing function, watermark processing can be made possible merely by replacing the existing storage apparatus. As the configuration is such that watermark processing, especially invisible watermark decoding, is performed on the part of the storage apparatus, the load on the server itself handling the video data can be reduced. As the video data themselves have, in the form of an invisible watermark embedded into them, the right owner information corresponding the video data, the two elements necessarily constitute a single file. As a result, the file system of an existing operating system can be used as it is. Since the configuration is such that information on the copyright owner and the like are obtained from the video data themselves, there is no need for dual management involving the storage of information for embedding the visible watermark, resulting in a saving in the file system management cost.

Figure 3:
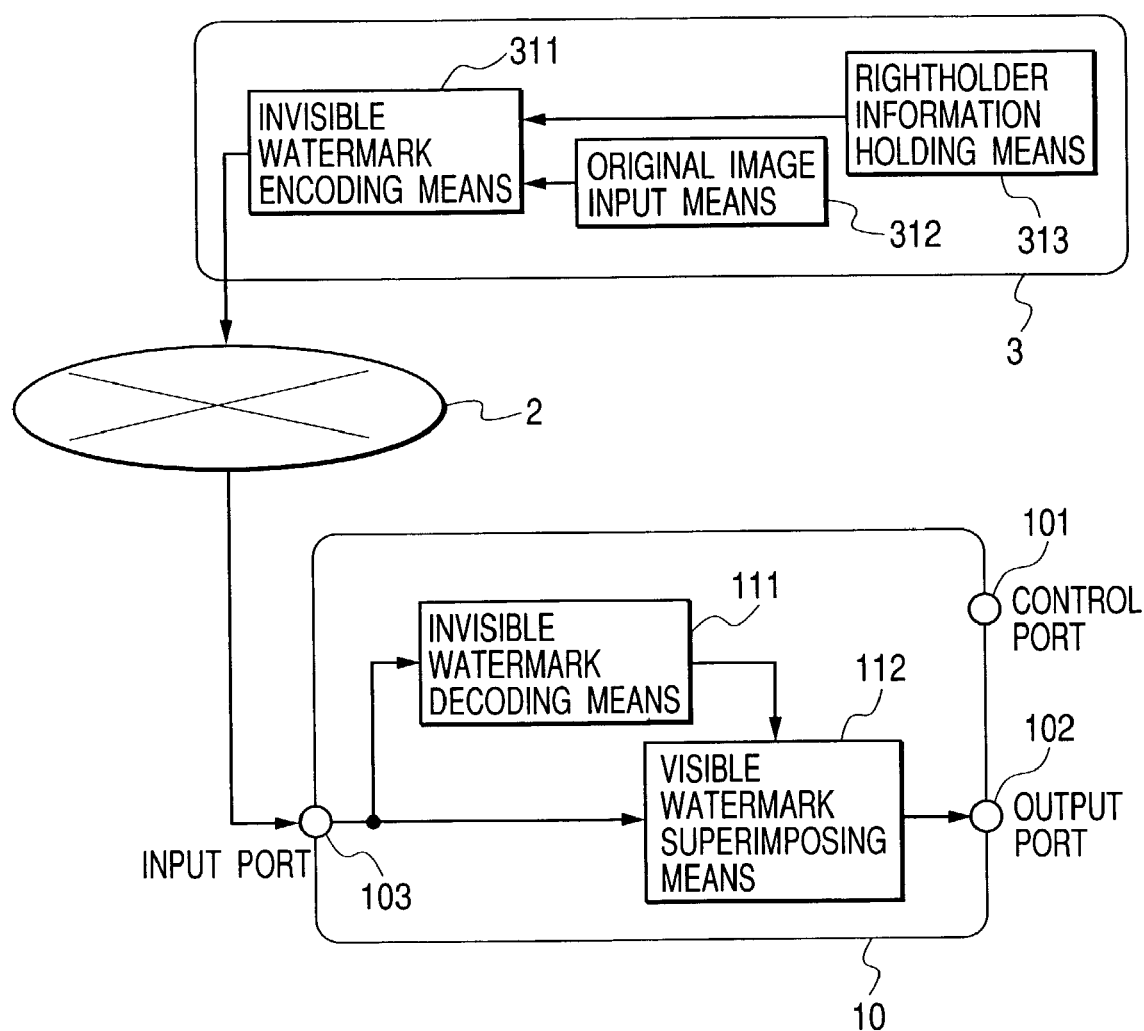
FIG. 3 illustrates a second preferred embodiment of the invention.

FIG. 3 illustrates a second preferred embodiment of the present invention.

This second embodiment has a configuration to superpose right owner information in a visible watermark over inputted video data and outputting as they are the video data so marked on a real time basis.

In FIG. 3, reference numeral 10 denotes a visible watermark embedding apparatus; 2, a network; and 3, a contents holder. The visible watermark embedding apparatus 10 comprises a control port 101, an output port 102, an input port 103, an invisible watermark decoding means 111 and a visible watermark superimposing means 112. The contents holder 3 comprises an invisible watermark encoding means 311, an original image input means 312 and a right holder information holding means 313. In the visible watermark embedding apparatus 10, right owner information is superimposed in a visible watermark over inputted video data, and the video data so marked are outputted as they are on a real time basis. The configurations and operations of the contents holder 3 and the network 2 are the same as those of their respective counterparts in the first embodiment. The visible watermark embedding apparatus 10 receives the video data from the network 2 via the input port 103. The inputted video data are sent to the invisible watermark decoding means 111, which extracts right owner information embedded into the video data in advance and sends it to the visible watermark superimposing means 112. The visible watermark superimposing means 112, on the basis of the extracted right owner information, superimposes a visible watermark over the video data, and outputs as they are the video data so marked to the output port 102 on a real time basis.

Since this second embodiment, like the first embodiment described above, combines an invisible watermark with a visible watermark, can effectively protect the rights of the copyright owner.

Figure 4:
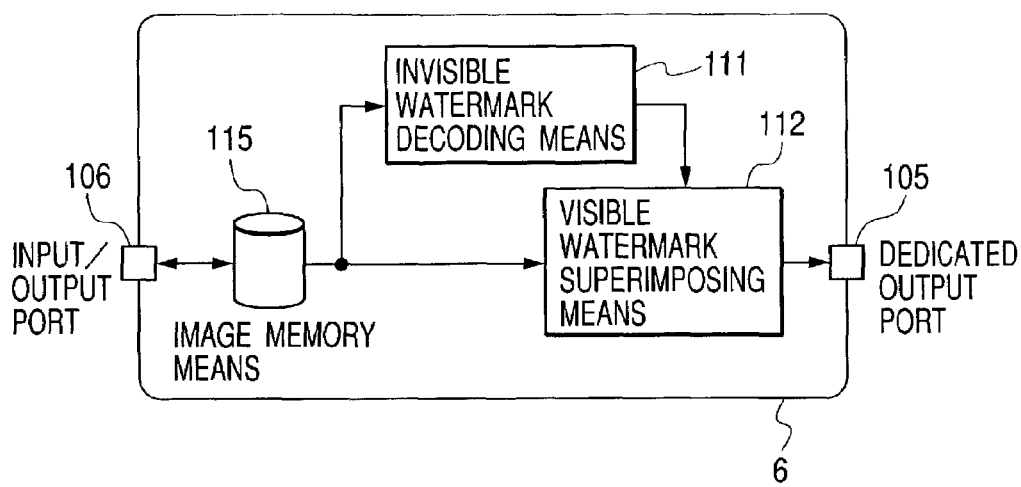
FIG. 4 illustrates a third preferred embodiment of the invention.

FIG. 4 illustrates a third preferred embodiment of the present invention.

This is a case of a data storage apparatus.

In FIG. 4, reference numeral 6 denotes a data storage apparatus provided with a plurality of access ports. The storage apparatus 6 comprises a dedicated output port 105, an input/output port 106, an invisible watermark decoding means 111, a visible watermark superimposing means 112 and an image memory means 115. Image data to be stored into the data storage apparatus 6 entered through the input/output port 106, and stored into the image memory means 115. At this time, like the data storage apparatus, a file system control means (not shown) or the like appropriately updates file system management information. Two methods are available for reading out the video data stored in the image memory means 115: one of reading through the input/output port 106 and the other of reading through the dedicated output port 105. By the method of reading the video data through the input/output port 106, as in reading out of a usual data storage apparatus, at a request from outside the data are sent to the input/output port 106 from the image memory means 115. By the method of reading the video data through the dedicated output port 105, the video data taken out of the image memory means 115 are sent to the invisible watermark decoding means 111, which extracts right owner information embedded in advance in the video data and sends it to the visible watermark superimposing means 112. The visible watermark superimposing means 112, on the basis of the extracted right owner information, superimposes a visible watermark over the video data, and outputs the video data so marked via the dedicated output port 105. This third embodiment has a configuration in which the input/output port is employed as a port for local use and the dedicated output port employed as a port for public use. For instance, an interface supporting the network file system is made available on the part of the input/output port, and connected to the local environment, such as the inside of the organization, for use therein. On the part of the dedicated output port, an interface supporting Web, hypertext transfer protocol (HTTP) is made available, and data outputted from this interface are made usable from outside the organization. The network file system and the HTTP interface may be configured either inside this third embodiment or of another server apparatus connected to the third embodiment from outside. In the latter case, this embodiment would like an ordinary data storage apparatus as viewed from the server apparatus, and accordingly can be easily connected.

This third embodiment of the invention can be operated as a usual data storage apparatus when accessed from inside the organization or as a data storage apparatus provided with a visible watermark embedding function when accessed from outside the organization. In other respects, it can provide basically the same effects and advantages as the first embodiment described above.

Figure 5:
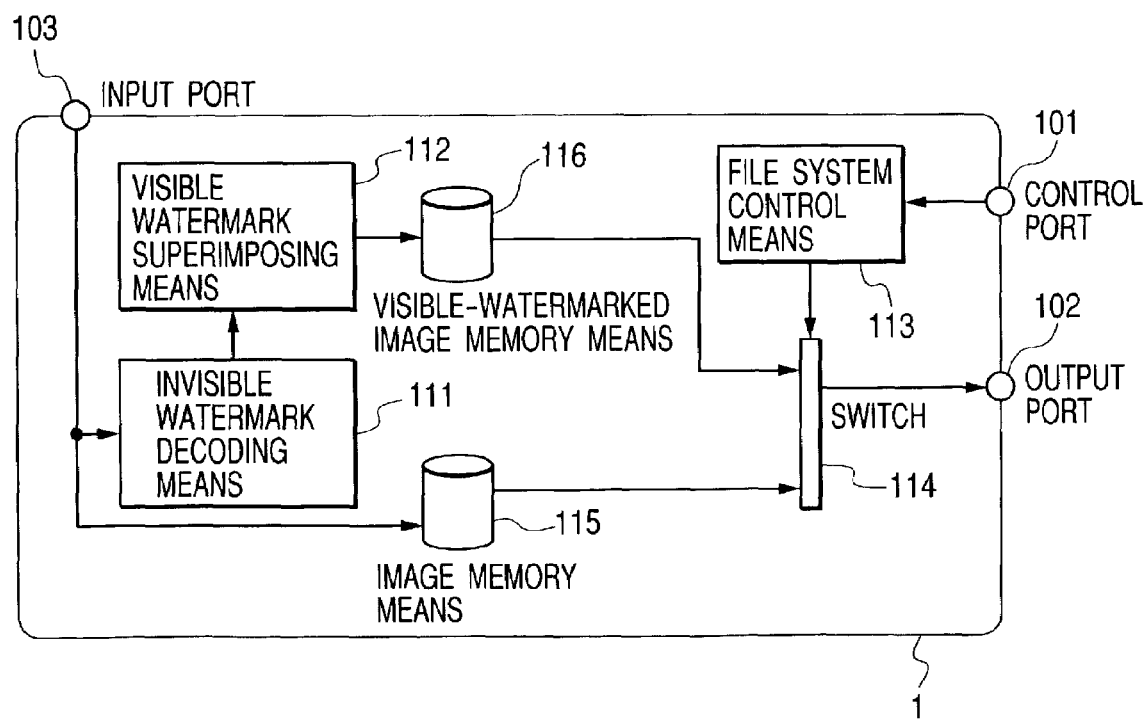
FIG. 5 illustrates a fourth preferred embodiment of the invention.

FIG. 5 illustrates a fourth preferred embodiment of the present invention.

Referring to FIG. 5, the video storage 1 is provided with a control port 101, an output port 102, an input port 103, an invisible watermark decoding means 111, a visible watermark superimposing means 112, a file system control means 113, an output selector means 114, an image memory means 115 and a visible-watermarked image memory means 116. In this configuration, video data inputted through the input port 103 are stored into the image memory means 115. In parallel with this processing, the video data are also sent to the invisible watermark decoding means 111. The invisible watermark decoding means 111 extracts right owner information embedded in the video data in advance, and sends it to the visible watermark superimposing means 112. The visible watermark superimposing means 112, on the basis of the extracted right owner information, superimposes a visible watermark over the video data and stores it into the visible-watermarked memory means 116. To read out video data stored in the image memory means 115 or the visible-watermarked memory means 116, a read request is sent to the file system control means 113 via the control port 101. The file system control means 113 determines the type of the received read request, and manipulates the output selector means 114 accordingly. Out of the video data taken out of the image memory means 115 and the visible-watermarked memory means 116, only those taken out of the former or the latter are selected by the output selector means 114 and outputted through the output port 102.

This fourth embodiment can distinguish and selectively output video data over which a visible watermark is superposed or video data over which no visible watermark is superposed according to the type of the read request. For instance, it is made possible to output video data over which no visible watermark is superimposed only when video data having information on a specific file access right are to be read out with a special user permission. Alternatively, it may be so arranged that outputting of video data having no visible watermark superimposed on them can be permitted only by making a read request in a state in which a specific keyword is added to the end of the file name, for instance in a state in which a additional extension is added. Since whichever arrangement can be implemented within the scope of any existing file system, connection to outside involves no difficulty.

Figure 6:
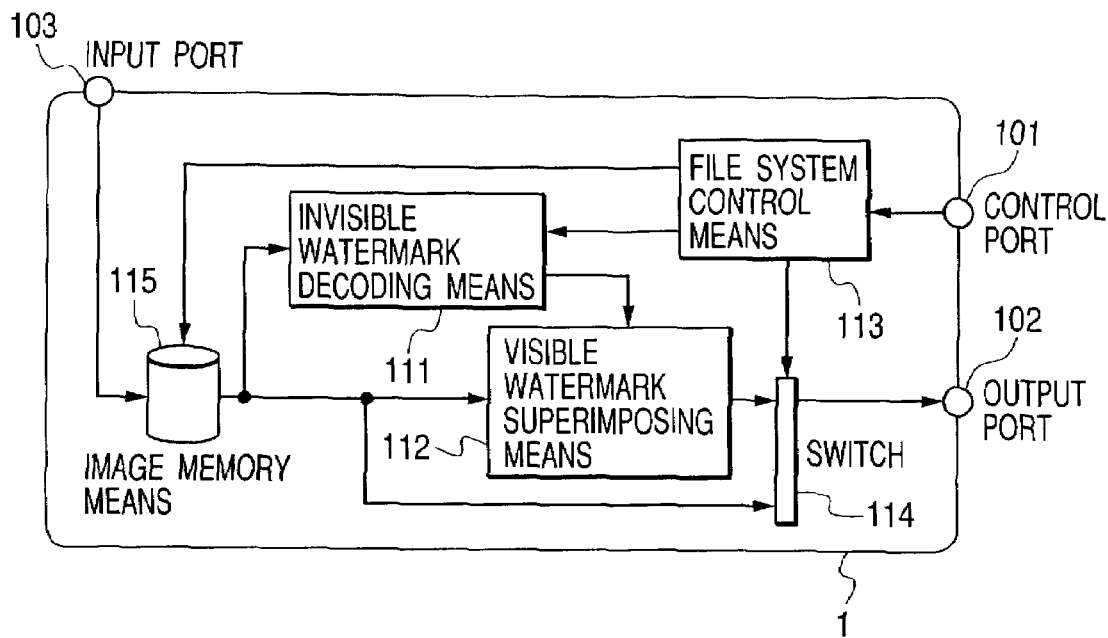
FIG. 6 illustrates a fifth preferred embodiment of the invention.

FIG. 6 illustrates a fifth preferred embodiment of the present invention.

Referring to FIG. 6, the video storage 1 is provided with a control port 101, an output port 102, an input port 103, an invisible watermark decoding means 111, a visible watermark superimposing means 112, a file system control means 113, an output selector means 114 and an image memory means 115. Image data inputted through the input port 103 is stored into the image memory means 115 under the control of the file system control means 113. To read out video data stored in the image memory means 115, a read request is sent to the file system control means 113 via the control port 101. The file system control means 113 determines the type of the received read request, and manipulates the output selector means 114 accordingly. The video data taken out of the image memory means 115 are sent to the output selector means 114 and the invisible watermark decoding means 111. The invisible watermark decoding means 111 extracts right owner information embedded in the video data in advance, and sends it to the visible watermark superimposing means 112. The visible watermark superimposing means 112, on the basis of the extracted right owner information, superimposes a visible watermark over the video data. The output selector means 114 selects either the video data received from the image memory means 115 or video data over which the visible watermark is superimposed, and outputs them through the output port 102.

This fifth embodiment can selectively output video data over which a visible watermark is superimposed or video data over which no visible watermark is superimposed according to the type of the read request. It is efficient because the capacity of the memory area for storing video data need not be very great. In other respects, it can provide basically the same effects and advantages as the first embodiment described above.

Figure 7:
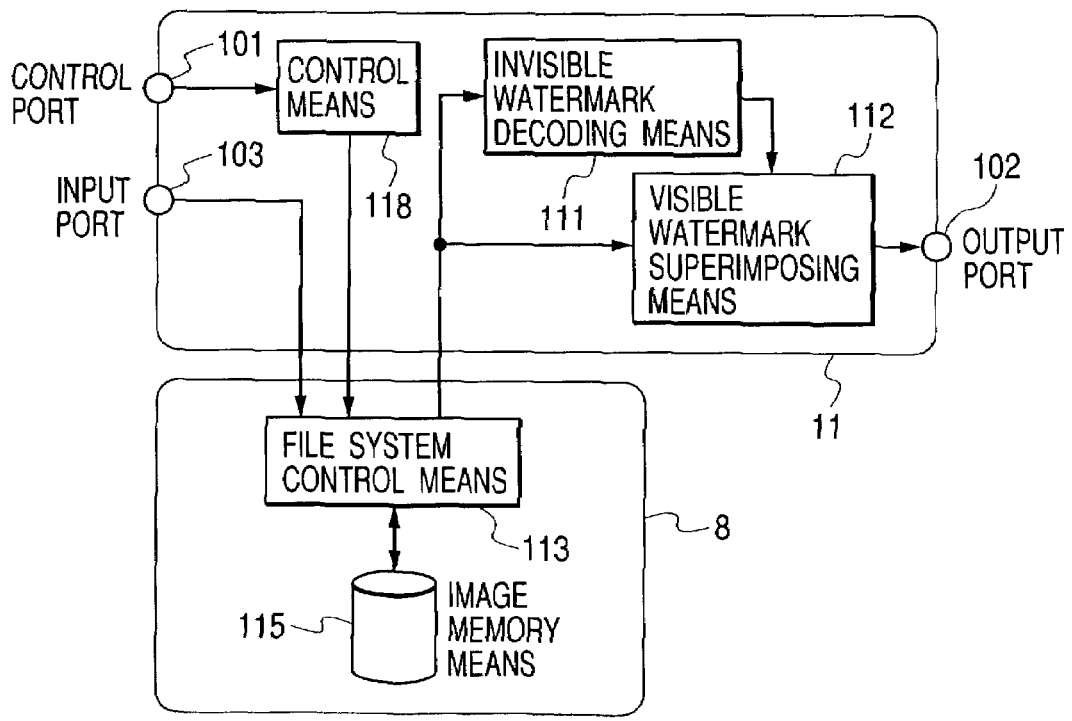
FIG. 7 illustrates a sixth preferred embodiment of the invention.

FIG. 7 illustrates a sixth preferred embodiment of the present invention.

In FIG. 7, reference numeral 8 denotes a data storage apparatus and 11, an image server apparatus. The storage apparatus 8 is provided with a file system control means 113 and a memory means 115. The image server apparatus 11 comprises a control port 101, an output port 102, an input port 103, an invisible watermark decoding means 111, a visible watermark superimposing means 112 and a control means 118. In this configuration, the image server apparatus 11 hands over video data inputted from the input port 103 to the data storage apparatus 8, and commands storage of the video data through the control means 118. When the data storage apparatus 8 receives the video data and the instruction to store them, the file system control means 113 controls the memory means 115 to have the received video data stored into the memory means 115. Next, the image server apparatus 11, upon receiving a read request for video data from outside, commands the data storage apparatus 8 to read out the video data. The data storage apparatus 8 takes out the specified video data from the memory means 115, and hands them over to the image server apparatus 11. The video data received by the image server apparatus 11 are sent to the invisible watermark decoding means 111. The invisible watermark decoding means 111 extracts right owner embedded in the video data in advance, and sends it to the visible watermark superimposing means 112. The visible watermark superimposing means 112, on the basis of the extracted right owner information, superimposes a visible watermark over the video data, and outputs the marked video data through the output port 102.

Since the sixth embodiment of the invention has a configuration in which a data storage apparatus for actually storing video data and an image server apparatus for watermark processing are separated from each other, an ordinary data storage apparatus can be used as it is for the data storage apparatus 8. This feature permits flexible hardware configuration. In other respects, it can provide basically the same effects and advantages as the third embodiment described above.

Figure 8:
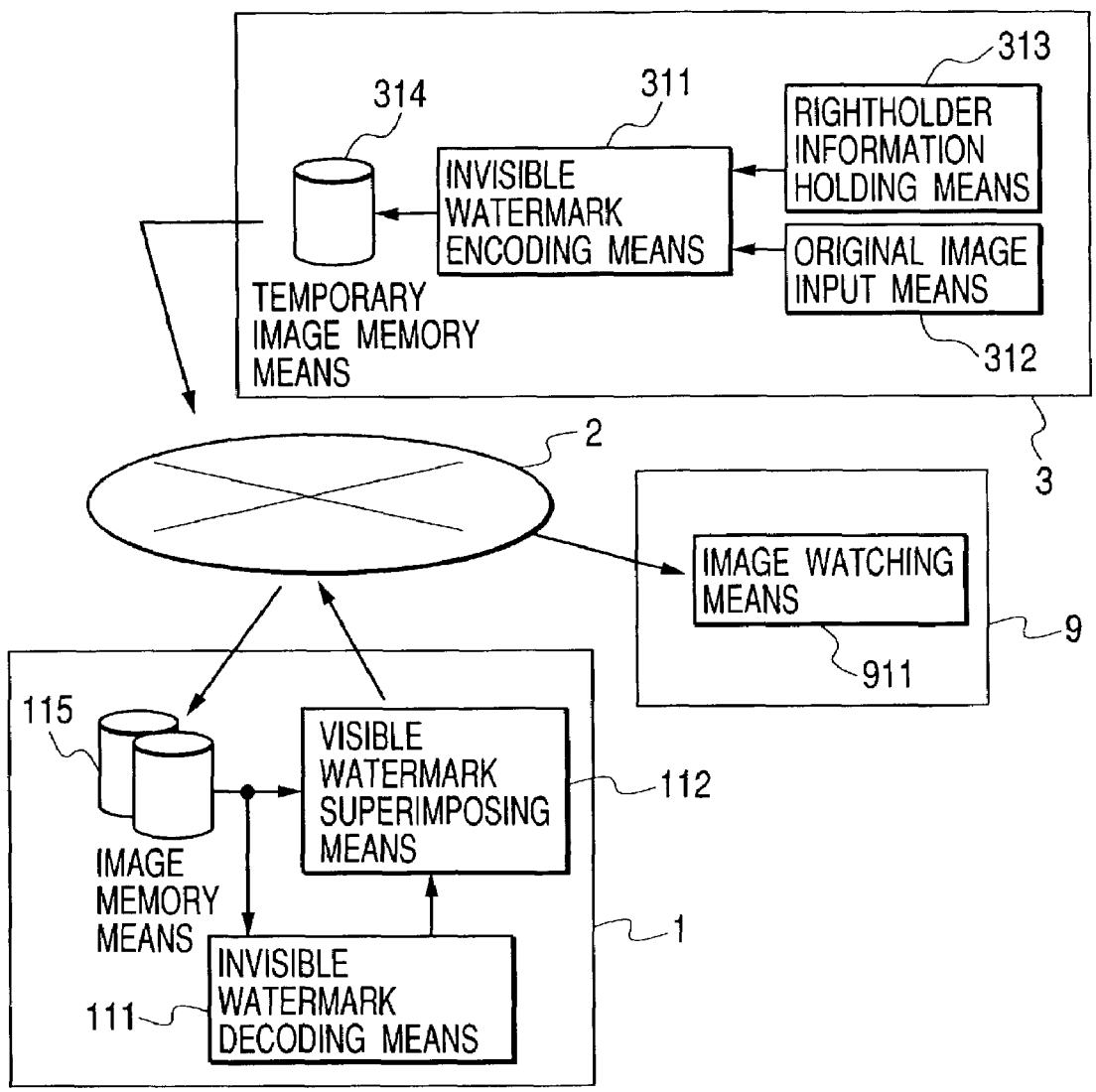
FIG. 8 illustrates a seventh preferred embodiment of the invention.

FIG. 8 illustrates a seventh preferred embodiment of the present invention.

In FIG. 8, reference numeral 1 denotes a video storage; 2, a network; 3, a contents holder; and 9, an image display apparatus. The video storage 1 is provided with an invisible watermark decoding means 111, a visible watermark superimposing means 112 and an image memory means 115. The contents holder 3 comprises an invisible watermark encoding means 311, an original image input means 312, a right holder information holding means 313 and a temporary image memory means 314. The image display apparatus 9 is provided with an image watching means 911. A file system control means and so forth are arranged within the video storage 1. The contents holder 3 hands over an original image obtained from the original image input means 312 and the right owner information stored in the right holder information holding means 313 in advance to the invisible watermark encoding means 311, stores video data consisting of the original image in which right owner information is embedded as an invisible watermark into the temporary image memory means 314, and outputs them as required. The video data outputted from the contents holder 3 are handed over to the video storage 1 via the network 2. The video storage 1 receives the video data from the network 2 via the input port, and stores them into the image memory means 115. On this occasion, the file system control means appropriately updates the file system management information as required. Next, the image display apparatus 9 makes a video data read request to the video storage 1 via the network 2. The video storage 1 receives the read request via the control port, and takes out the request video data from the image memory means 115. The video -data that have been taken out are sent to the invisible watermark decoding means 111. The invisible watermark decoding means 111 extracts right owner information embedded in the video data in advance, and sends it to the visible watermark superimposing means 112. The visible watermark superimposing means 112, on the basis of the extracted right owner information, superimposes a visible watermark over the video data, and sends the marked video data to the image display apparatus 9 via the network 2. The image display apparatus 9, upon receiving the video data via the network 2, hands them over to the image watching means 911 to cause image displaying or the like to be done.

This seventh embodiment of the invention can integrate all the functions into a single system by, for instance, having the contents holder 3 serve the copyright owner of the video data, the video storage 1 serve an intermediate distributor of the video data, and the image display apparatus 9 serve the end user of the video data. In other respects, it can provide basically the same effects and advantages as the first embodiment described above.

Figure 9:
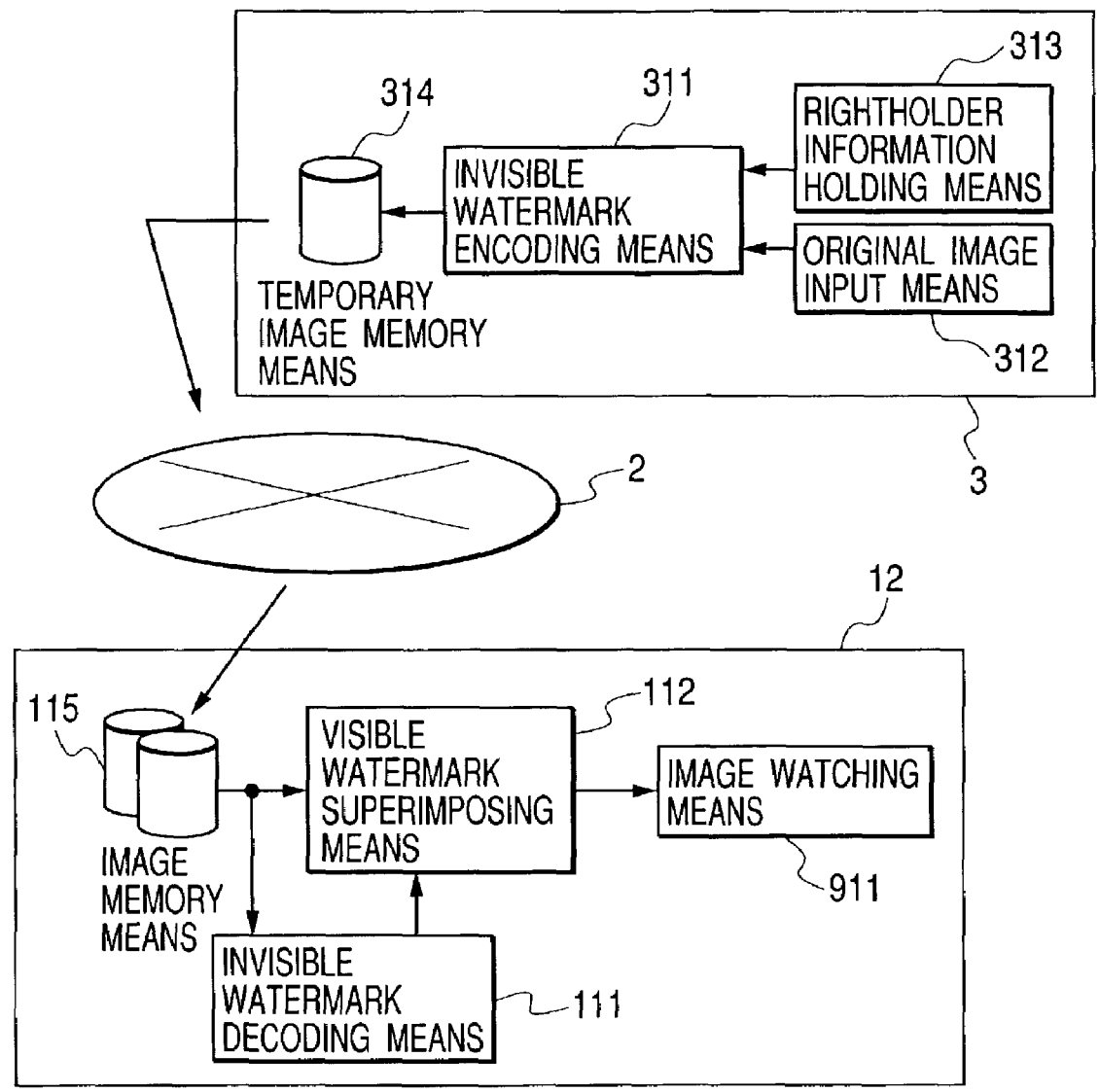
FIG. 9 illustrates an eighth preferred embodiment of the invention.

FIG. 9 illustrates an eighth preferred embodiment of the present invention.

In FIG. 9, reference numeral 12 denotes an image display apparatus with a video storage. Other constituents are the same as their respective counterparts in the seventh embodiment described above. This embodiment is an example of a single constituent element into which, like a set-top box with a video storage function for instance, an invisible watermark decoding means 111, a visible watermark superimposing means 112, an image memory means 115 and an image watching means 911 are incorporated.

This eighth embodiment can provide basically the same effects and advantages as the seventh embodiment described above.

Although it is supposed for every one of the embodiments of the present invention described so far that rights information and the like are embedded in video data, the invention is not limited to this, but the rights information and the like can as well be embedded in audio data for instance. In place of embedding an invisible watermark as described above, for instance rights information can be embedded indistinguishably into audio information, or instead of a visible watermark a message concerning rights information can be inserted at regular intervals. Information extracted from an invisible watermark can well be indirectly indicated instead of directly superposing it as a visible watermark. Where, for instance, information extracted from an invisible watermark includes information on the type of visible watermark to be superposed, it can be made switchable on the basis of this information between the display of only a logo image of the copyright owner and that of a text representing the name of the copyright owner together with the logo image. In this arrangement, the logo image itself and the text representing the name of the copyright owner need not be extracted from the invisible watermark, but only numerical codes representing the logo and the copyright owner, for instance, can be extracted to obtain the logo and the text representing the name of the copyright owner on the basis of these codes. Although it is supposed in the embodiments of the invention described above that the information embedded in the invisible watermark is right owner information and that the image to be superimposed as a visible watermark is supposed to represent copyright owner information taken out of the invisible watermark, the invention is not confined to this, but any desired information can be embedded in video data as an invisible watermark and any desired visible watermark may be superimposed on the basis of the information extracted from these video data. For instance, information on the days during which the video data can be lawfully played can be embedded in advance as an invisible watermark, and no visible watermark would be superimposed if the image is played within those days, or copyright owner information may be superimposed in only a small size during the specified days, after which the copyright owner information would be superimposed in a more conspicuous way. Or where a system in which a certain quantity of advertising is to be displayed in played given video data for instance, information on the attributes of advertising to be superimposed in the video data may be embedded in an invisible watermark and, at the time of playing the image, the advertising image and the like could be selected on the basis of this information extracted from the invisible watermark.

Inventions related to those set forth in the claims of this patent application and described as preferred embodiments above include: (1) a configuration in which the digital contents are digital video contents or digital audio contents; and (2) a data storage apparatus provided with a plurality of file system interfaces, wherein each of some or all of the plurality of file system interfaces has an input means for receiving a first information signal comprising additional information embedded in digital contents as invisible electronic watermark information, a memory means in which digital contents in the received information signal are to be stored, a decoding means for decoding invisible electronic watermark information embedded in the received information signal and converting it into visible watermark information, a visible watermark information superimposing means for embedding the visible watermark information into the digital contents read out of the memory means to form a second information signal, and an output means for outputting the second information signal, the input means and the output means being configured to constitute a file system interface and permitting the additional information to be outputted as visible information together with the digital contents.

According to the present invention, copyrights and the like can be effectively protected with additional information, and the management cost of file systems can be reduced, too.

We claim:

1. A contents distributing apparatus for visibly arranging additional information on contents and distributing the contents, comprising:
    an input unit which inputs contents on which invisible electronic watermark information is superimposed;
    a control port which receives a read request information from outside and outputs said read request information, wherein said read request information is a control information for the control of making said additional information visible or invisible;
    a memory which stores said contents on which invisible electronic watermark information input by the input unit is superimposed;
    an extracting unit which extracts the additional information as invisible electronic watermark information superimposed on the contents stored in said memory;
    a superimposing unit which embeds visible information into the contents stored in said memory and generates contents on which the visible information has been superimposed, wherein said visible information is visible graphics data which is related to said additional information extracted by the extracting unit;
    an output unit which outputs said contents on which the visible information has been superimposed and forms a single file of said contents; and
    a controller which controls said memory, said extracting unit, said superimposing unit and said output unit, and causes said extracting unit to extract the additional information from the invisible electronic watermark information which is superimposed on the contents and causes said output unit to output the contents on which the visible information has been superimposed, based on said read request information output from said control port.

2. The contents distributing apparatus, according to claim 1, wherein said additional information is either copyright owner information or information on viewing/listening restriction.

3. The contents distributing apparatus, according to claim 1, wherein said visible information is visible watermark information.

4. The contents distributing apparatus, according to claim 1, wherein said additional information is information concerning copyright owner information, and said visible information is either name of the copyright owner or the logo image based on the information concerning copyright owner information.

5. A contents distributing system for distributing contents, comprising:

means for superimposing additional information as invisible electronic watermark information to the contents;
a transmitting unit which transmits the contents on which said invisible electronic watermark information is superimposed;
a receiving unit which receives the contents on which said invisible electronic watermark information is superimposed;
a control port which receives and outputs a read request information, wherein said read request information is a control information for the control of making said additional information visible or invisible;
a memory which stores said contents on which invisible electronic watermark information is superimposed;
an extracting unit which extracts additional information as invisible electronic watermark information superimposed on the contents stored in said memory;
a superimposing unit which embeds visible information into the contents stored in said memory and generates contents on which the visible information has been superimposed, wherein said visible information is visible graphics data which is related to said additional information extracted by the extracting unit;
an output unit which outputs said contents on which the visible information has been superimposed and forms a single file of said contents; and
a controller which controls said memory, said extracting unit, said superimposing unit and said output unit, and causes said extracting unit to extract the additional information from the invisible electronic watermark information which is superimposed on the contents and causes said output unit to output the contents on which the visible information has been superimposed, based on said read request information output from said control port.

6. A data storage apparatus capable of visibly arranging additional information on digital contents and outputting the digital contents of this arrangement, comprising:
an input unit which receives a first information signal consisting of digital contents in which additional information is embedded as invisible electronic watermark information;
a control port which receives a read request information from outside and outputs said read request information, wherein said read request information is a control information for the control of making said additional information visible or invisible;
a memory which is controlled based on said read request and which stores the digital contents of said first information signal;
a decoder which is controlled based on said read request information and which decodes the additional information as invisible electronic watermark information embedded in said first information signal and extracts the additional information as visible watermark information;
a visible watermark information superimposing unit which is controlled based on said read request information and which embeds said visible watermark information into the digital contents read out of said memory to form a second information signal; and
an output unit which is controlled based on said read request information and which outputs the second information signal and forms a single file of the digital contents of said second information signal;
wherein said input unit and said output unit are configured as an interface of a file system, and are configured to output said additional information as visible information together with said digital contents, wherein said visible information is visible graphics data which is related to said additional information.

7. A contents distributing method, comprising the steps of:
superimposing additional information as invisible electronic watermark information into the contents;
transmitting the contents on which said invisible electronic watermark information is superimposed;
receiving the contents on which said invisible electronic watermark information is superimposed;
storing the contents on which said invisible electronic watermark information is superimposed, based on a read request information, wherein said read request information is a control information for the control of making said additional information visible or invisible;
extracting said additional information as invisible electronic watermark information superimposed into the stored contents, based on said read request information;
embedding visible information into the stored contents and generating contents on which the visible information has been superimposed, wherein said visible information is visible graphics data which is related to said additional information; and
outputting contents on which visible information has been superimposed and forming a single file of said contents, based on said read request information.

8. A data storage apparatus for storing contents superimposed invisible electronic watermark information, comprising:
an input unit which inputs contents on which invisible electronic watermark information is superimposed;
a control port which receives a read request information from outside and outputs said read request information, wherein said read request information is a control information for the control of making said additional information visible or invisible
a memory which stores said contents on which invisible electronic watermark information input by the input unit is superimposed;
an extracting unit which extracts additional information as invisible electronic watermark information superimposed on the contents stored in said memory;
a superimposing unit which embeds visible information into the contents stored in said memory and generates contents on which the visible information has been superimposed, wherein said visible information is visible graphics data which is related to said additional information extracted by the extracting unit;
an output unit which outputs said contents on which the visible information has been superimposed and forms a single file of said contents; and
a controller which controls said memory, said extracting unit, said superimposing unit and said output unit, and causes said extracting unit to extract the additional information from the invisible electronic watermark information which is superimposed on the contents and causes said output unit to output the contents on which the visible information has been superimposed, based on said read request information output from said control port.

9. The data storage apparatus, according to claim 8, wherein said additional information is either copyright owner information or information on viewing/listening restriction.

10. The data storage apparatus, according to claim 8, wherein said visible information is visible watermark information.

11. The data storage apparatus, according to claim 8, wherein said additional information is information concerning copyright owner information, and said visible information is either the name of the copyright owner or the logo image based on the information concerning copyright owner information.

\* \* \* \* \*